(12) United States Patent
Rowland et al.

(10) Patent No.: US 6,674,945 B1
(45) Date of Patent: Jan. 6, 2004

(54) ELECTRIC CONDUCTORS INCORPORATING OPTICAL FIBRES

(75) Inventors: Simon Mark Rowland, Tarporley (GB); David John Walker, Runcorn (GB)

(73) Assignee: CCS Technology, Inc., Wilmington, DE (US)

(*) Notice: Subject to any disclaimer, the term of this patent is extended or adjusted under 35 U.S.C. 154(b) by 0 days.

(21) Appl. No.: 10/069,317

(22) PCT Filed: Aug. 17, 2000

(86) PCT No.: PCT/GB00/03164

§ 371 (c)(1),
(2), (4) Date: Feb. 15, 2002

(87) PCT Pub. No.: WO01/13154

PCT Pub. Date: Feb. 22, 2001

(30) Foreign Application Priority Data

Aug. 18, 1999 (GB) ............................................. 9919399

(51) Int. Cl.[7] ................................................. G02B 6/44
(52) U.S. Cl. ........................................ 385/101; 385/109
(58) Field of Search ................................. 385/101, 103, 385/104, 109, 112

(56) References Cited

U.S. PATENT DOCUMENTS

| | | | | |
|---|---|---|---|---|
| 4,239,336 A | * | 12/1980 | Parfree et al. | 385/101 |
| 4,341,440 A | | 7/1982 | Trezeguet et al. | |
| 4,349,243 A | * | 9/1982 | Amano et al. | 385/109 |
| 4,367,917 A | | 1/1983 | Gray | 350/96.23 |
| 4,490,009 A | * | 12/1984 | Nakai et al. | 385/101 |
| 4,577,925 A | * | 3/1986 | Winter et al. | 385/106 |
| 4,579,420 A | * | 4/1986 | Winter et al. | 385/113 |
| 4,767,182 A | * | 8/1988 | Parfree et al. | 385/107 |
| 4,801,192 A | * | 1/1989 | Wehner | 385/101 |
| 5,369,720 A | | 11/1994 | Parry et al. | 385/114 |
| 6,236,789 B1 | * | 5/2001 | Fitz | 385/101 |

FOREIGN PATENT DOCUMENTS

| | | | |
|---|---|---|---|
| DE | 3805847 A1 | 9/1989 | G02B/6/44 |
| DE | 4429022 A1 | 2/1996 | H01B/11/22 |
| EP | 0330278 B1 | 9/1993 | G02B/6/44 |
| EP | 0744638 A2 | 11/1996 | G02B/6/44 |
| EP | 0744639 A2 | 11/1996 | G02B/6/44 |
| EP | 09320063 A2 | 7/1999 | |
| EP | 0620565 B1 | 8/1999 | H01B/11/18 |
| GB | GB2018484 A | 4/1979 | G02B/5/14 |
| GB | 2165060 A | 4/1986 | G02B/6/44 |
| JP | 57154202 | 9/1982 | |
| JP | 60024511 A | 2/1985 | G02B/6/44 |
| JP | 02146006 A | 8/1990 | G02B/6/44 |
| JP | 302519 | 11/1995 | |
| JP | 07302519 | 11/1995 | |
| JP | 08180746 | 12/1996 | |
| JP | 10153725 A | 6/1998 | G02B/6/44 |

\* cited by examiner

*Primary Examiner*—Hae Moon Hyeon

(57) ABSTRACT

An electric conductor incorporates at least one optical fibre and has a central axial element with at least one layer of elements helically stranded about it. At least one of the elements, preferably the central axial one, includes at least one optical fibre which is enclosed in a longitudinally extending welded metal tube (typically stainless steel). A second metal tube of greater thickness and higher conductivity than the welded metal tube and having an unwelded longitudinal seam surrounds the welded tube. The second tube is typically of aluminium and served to increase the diameter of the element so that a greater range of useful conductor sizes can be formed by using it in conjunction with appropriately chosen wire diameters.

4 Claims, 1 Drawing Sheet

ELECTRIC CONDUCTORS INCORPORATING OPTICAL FIBRES

Figure 1:
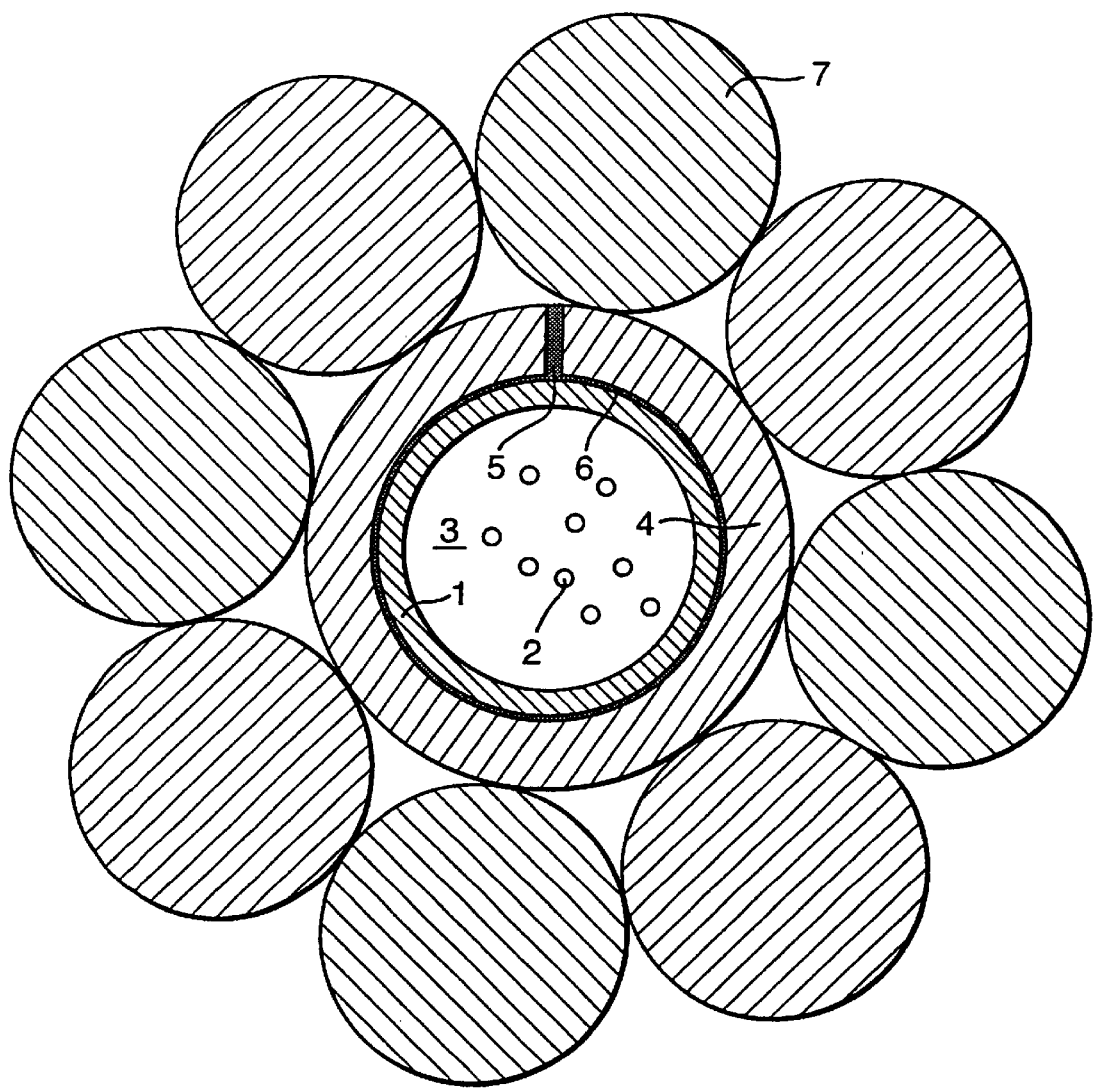

This invention relates to electric conductors incorporating optical fibres for communication purposes, and more especially (though not exclusively) to uninsulated conductors for use as earth conductors, or if desired as phase conductors, in an overhead electric power line. For brevity, such conductors will be referred to herein by the customary abbreviation "OPGW" (representing, less than precisely, optical ground wire).

The first successful OPGW designs (such as that introduced by our predecessors under the trademark FIBRAL) used fibres, or fibre ribbons, loosely housed in an aluminium tube formed around them by deforming an initially U-shaped extrusion, and generally filled with a waterproofing gel. Subsequently other designs have become established and even preferred by some suppliers.

More recently, a technique has become readily available for enclosing optical fibres in a welded metal tube (usually stainless steel) of relatively small cross-section—more specifically, a few millimetres in diameter and a fraction of a millimetre in wall thickness. Such sub-units are commonly referred to as "fibre in metal tube" (or "fibre in steel tube"), and this may be abbreviated to "FIMT". FIMT can be incorporated among the wires to be stranded around a central core wire, but this subjects the FIMT to torsional manipulation during cable manufacture, which may risk degradation of the fibres and mechanical integrity of the tube, (and it is considered necessary to have a layer of plain wires over the layer containing an FIMT, for mechanical protection during and after installation). If the FIMT is being stranded around a core wire in this way, its diameter must be the same as or slightly smaller than that of the metal wires between which it is positioned. This restriction is one of the reasons why it is desirable to position the FIMT axially and strand plain wires around it. This, however, constrains conductor design significantly as the diameter and wall thickness of FIMT cannot be easily adjusted, and in particular it is difficult to achieve an overall diameter greater than about 6 mm, and this small diameter may demand the use of fewer and/or smaller wires in the layer immediately over the FIMT than would otherwise be desired, and in some cases may require an additional layer of wires, at significantly greater manufacturing cost.

It is therefore desirable to be able to increase the effective overall diameter of an FIMT economically and preferably to increase the overall conductance per unit area of the conductor.

JP 07-302519 describes an electric conductor comprising optical fibres and intended to provide an air-tight enclosure round the cables that exhibits long-term stability. It comprises a central axial element with one layer of elements helically stranded about it, and the central element comprises optical fibres enclosed in a longitudinally extending welded metal tube itself enclosed in a second metal tube. The first tube may be of copper or stainless steel and the second of aluminium.

In accordance with the invention, an OPGW or other electric conductor incorporating at least one optical fibre comprises a central axial element with at least one layer of elements helically stranded about it, at least one of the elements comprising at least one optical fibre enclosed in a longitudinally extending welded metal tube itself enclosed in a second metal tube of higher conductivity than the welded metal tube and is characterised in that the said second metal tube is of greater thickness than the said welded metal tube and has an unwelded longitudinal seam.

If there is only one element containing an optical fibre, it is preferably the central axial one.

The welded tube is preferably of stainless steel because of its good corrosion resistance and relatively easy welding; the second tube is preferably of aluminium (or a high-conductivity dispersion-strengthened aluminium alloy if designed for long spans) for good conductivity and low density—in special cases copper might possibly be an alternative, for example if the conductor will be exposed to severely corrosive atmosphere.

The other elements will normally be plain wires which may similarly be of aluminium, aluminium alloy or copper but may also be of aluminium-clad (or copper-clad) steel, or some (but not normally all) of them may be of galvanised steel contributing little but tensile strength.

Optionally the longitudinal seam of the second metal tube may be sealed and/or the second metal tube may be bonded to the welded metal tube using a non-metallic adhesive, for better corrosion-resistance.

The second tube is preferably formed by first extruding a U-section (preferably comprising a semicircular base and straight limbs) and after inserting the FIMT wrapping its limbs to abut or nearly abut each other; the edges of the limbs may be shaped to interlock when engaged. The U-section is preferably extruded by the CONFORM technique (for which machinery is commercially available, for example from Holton Machinery Ltd) because it operates continuously and avoids possible property discontinuities that might arise if conventional ram extrusion were used. Hydrostatic extrusion may also be suitable in some cases. At least if the wall thickness of the second tube is not much greater than that of the welded tube, it may be a viable alternative to form it by wrapping an initially flat metal strip.

The invention will be further described, by way of example, with reference to the accompanying drawing in which FIG. 1 is a cross-section of one preferred form of OPGW in accordance with the invention.

The OPGW shown in FIG. 1 comprises a laser-welded stainless-steel tube 1 within which are a number of optical fibres 2 and optionally a gel filling 3. The fibres have a length greater than the length of the tube ("excess" length) in the usual way to ensure that they will be substantially free of tensile loading even when the tube is elongated under tension, within the design limits. The fibres may have any appropriate coating or other protection.

Around the tube 2 is a second tube 4 of aluminium with an unwelded seam 5. An adhesive (6) seals the seam and the interface between the two tubes. Optionally a layer of grease may be applied before the addition of a layer of wires 7 to complete the conductor (though the addition of one or more further layer of wire and/or of a plastics jacket for corrosion-protection is not excluded). The wires 7 may be of aluminium-clad steel, aluminium or aluminium alloy, or some of them may be galvanised steel wires.

EXAMPLE 1

An OPGW of the form shown in FIG. 1 comprises 24 fibres contained (with nominally 0.10 (±0.05)% excess length) in a stainless-steel tube with an outside diameter of 3.4 mm and a wall thickness of 0.2 mm, a second tube of aluminium with a wall thickness of 1.0 mm, and 9 aluminium-clad steel wires each 2.7 mm in diameter and with a nominal radial thickness of aluminium of 0.27 mm. These wires are arranged in a single layer and contribute to a total cross-section of 65 mm$^2$. The OPGW has a rated tensile strength of 64.4 kN and an electrical overload capacity of 28 k(A$^2$)s.

A 40 m sample of an OPGW of this design was subjected to electrical short-circuit testing as follows: a 15 m test portion of the sample was defined by fitting a pair of helical deadend fittings and tensioned using a chain-ratchet mechanism to a load of 6.6 kN (670 kgf or 18% of its rated tensile strength). Three thermocouples were stuck to the surface of the conductor, one at the midpoint of the test portion and the others 1 m from the respective deadend fitting (measuring from the "crossover" point marked on the fitting, nominally at the outer axial end of the helices).

A current pulse of 1 second duration and with values ranging from 4.76 to 6.07 kA were applied, always starting with the sample at a temperature close to 40° C. (a preliminary pulse was used to obtain the starting temperature for the first test); for each pulse, the highest temperature reached (as an average of the three thermocouples) observed; input and output optical power was measured one minute before each pulse, at the time of the pulse, and two and four minutes afterwards.

Temperature measurements were as follows:

| Pulse no(s). | current (kA) | start temperature (° C.) | relative pulse energy ((kA)$^2$s) | highest temperature (° C.) |
|---|---|---|---|---|
| 2* | 4.76 | 40 | 22.7 | 138 |
| 3 | 5.28 | 40 | 27.9 | 165 |
| 5* | 5.39 | 39 | 29.0 | 179 |
| 6 | 5.38 | 40 | 28.9 | 182 |
| 7 | 5.37 | 40 | 28.8 | 181 |
| mean | | | 28.9 | 180 |
| 8 | 5.74 | 39 | 32.9 | 203 |
| 9 | 5.71 | 40 | 32.6 | 200 |
| 10 | 5.67 | 41 | 32.15 | 202 |
| mean | | | 32.5 | 202 |
| 11 | 5.98 | 38 | 35.8 | 215 |
| 12 | 5.90 | 40 | 34.8 | 218 |
| 13 | 5.90 | 40 | 34.6 | 218 |
| mean | | | 35.0 | 216 |
| 14 | 6.07 | 40.5 | 36.8 | 233 |

*pulse 1 was used to set the start temperature, and pulse 4 measurements were rejected because the temperature had fallen too far.

The peak temperatures observed were substantially lower than expected on the basis of measurements on other types of OPGW design (including designs with an FIMT unit incorporated in a stranded layer between a plain core wire and an outer wire layer); this observation is not yet understood.

No substantial degradation of optical performance was observed; in fact a small reduction in attenuation appeared to have occurred; this has not been explained, but it is noted that it might be an effect of tensioning, or of a relaxation facilitated by the short-circuit tests.

OTHER EXAMPLES

With an OPGW of the form shown in FIG. 1 comprising optical fibres contained within a stainless steel tube with an outside diameter of 3.4 mm and a wall of 0.2 mm and a second tube of aluminium with a wall thickness of 1.0 mm the following constructions are possible using an outer layer of plain round wires:

| Example Number | No. of wires around centre | Diameter of these wires (mm) | Cross-sectional area (mm) | Short-circuit rating (k(A$^2$)s) | OPGW diameter (mm) |
|---|---|---|---|---|---|
| — | 6 or less | Wires too large and stiff to strand satisfactorily on the FIMT | | | |
| 2 | 7 | 3.90 | 97 | 56 | 13.20 |
| 3 | 8 | 3.20 | 78 | 38 | 11.80 |
| [1] | 9 | 2.70 | 65 | 28 | 10.80 |
| 4 | 10 | 2.30 | 55 | 21 | 10.00 |
| 5 | 11 | 2.06 | 50 | 18 | 9.52 |
| — | 12 or more | Wires too small - risk of breakage in manufacture and/or damage on lightning strike | | | |

Without the second tube the only geometrical possible and sensible constructions with only one layer of round stranded wires would be:

| No. of wires | Diameter of these wires (mm) | Cross sectional area (mm) | Short circuit rating (k(A$^2$)s) | OPGW diameter (mm) |
|---|---|---|---|---|
| 5 or less | Wires too large and stiff to strand satisfactorily on the FIMT | | | |
| 6 | 3.20 | 48 | 11 | 9.8 |
| 7 | 2.50 | 34 | 6 | 8.4 |
| 8 or more | Wires too small- risk of breakage in manufacture and/or damage on lightning strike | | | |

What is claimed is:

1. An electric conductor incorporating at least one optical fibre comprising: a central axial element with at least one layer of elements helically stranded about it, the central axial element comprising at least one optical fibre enclosed in a longitudinally extending welded metal tube itself enclosed in a second metal tube of higher conductivity than the welded metal tube, said second metal tube is of greater thickness than said welded metal tube and has an unwelded longitudinal seam.

2. An electric conductor as claimed in claim 1 in which the second tube is of a high-conductivity dispersion-strengthened aluminium alloy.

3. An electric conductor as claimed in claim 1 in which other elements are plain wires of aluminium, aluminium alloy or copper, of aluminium-clad or copper-clad steel, or in which some are of galvanised steel.

4. An electric conductor as claimed in claim 1 in which the longitudinal seam of the second metal tube is sealed and/or the second metal tube is bonded to the welded metal tube by a non-metallic adhesive.

* * * * *